United States Patent
Henning et al.

(10) Patent No.: US 10,457,752 B2
(45) Date of Patent: Oct. 29, 2019

(54) SILANE FUNCTIONALIZED POLY (FARNESENE) AND RUBBER COMPOUND COMPRISING THE SAME

(71) Applicant: Fina Technology, Inc., Houston, TX (US)

(72) Inventors: Steven K. Henning, Downingtown, PA (US); Jean-Marc Monsallier, Saint-Martin-Longueau (FR); Nan Tian, Wilmington, DE (US)

(73) Assignee: FINA TECHNOLOGY, INC., Houston, TX (US)

( * ) Notice: Subject to any disclaimer, the term of this patent is extended or adjusted under 35 U.S.C. 154(b) by 0 days.

(21) Appl. No.: 15/616,169

(22) Filed: Jun. 7, 2017

(65) Prior Publication Data

US 2018/0355073 A1    Dec. 13, 2018

(51) Int. Cl.
| | |
|---|---|
| *C08C 19/25* | (2006.01) |
| *C08C 19/28* | (2006.01) |
| *C08K 9/06* | (2006.01) |
| *C08L 9/06* | (2006.01) |
| *C08K 3/36* | (2006.01) |
| *C08F 236/10* | (2006.01) |
| *C08K 5/548* | (2006.01) |
| *C08C 19/44* | (2006.01) |
| *C08L 9/00* | (2006.01) |
| *C08L 47/00* | (2006.01) |

(52) U.S. Cl.
CPC ............. *C08C 19/25* (2013.01); *C08C 19/28* (2013.01); *C08C 19/44* (2013.01); *C08F 236/10* (2013.01); *C08K 3/36* (2013.01); *C08K 5/548* (2013.01); *C08K 9/06* (2013.01); *C08L 9/00* (2013.01); *C08L 9/06* (2013.01); *C08L 47/00* (2013.01)

(58) Field of Classification Search
CPC ......... C08C 19/25; C08C 19/28; C08C 19/44; C08F 236/10; C08K 3/36; C08K 5/548; C08K 9/06; C08L 9/06; C08L 9/00; C08L 47/00
USPC ...................................................... 524/492
See application file for complete search history.

(56) References Cited

U.S. PATENT DOCUMENTS

| | | | |
|---|---|---|---|
| 2,940,830 A | 6/1960 | Thornhil | |
| 3,157,604 A | 11/1964 | Strobel | |
| 4,381,377 A | 4/1983 | Kampf et al. | |
| 4,396,751 A | 8/1983 | Kampf et al. | |
| 4,397,994 A | 8/1983 | Takeuchi et al. | |
| 2010/0056714 A1 | 3/2010 | McPhee | |
| 2016/0376386 A1 | 12/2016 | Yoo et al. | |
| 2016/0376395 A1 | 12/2016 | Pleska | |
| 2017/0137599 A1* | 5/2017 | Oshimo | .................. C08K 3/04 |

FOREIGN PATENT DOCUMENTS

| | | |
|---|---|---|
| DE | 3010113 A1 | 10/1981 |
| DE | 3129082 A1 | 2/1983 |
| DE | 102015210421 A1 | 12/2016 |
| DE | 102015210423 A1 | 12/2016 |
| EP | 1013710 A1 | 6/2000 |
| EP | 2783880 A1 | 10/2014 |
| EP | 3037467 A1 | 6/2016 |
| EP | 3159346 A1 | 4/2017 |
| JP | 62265301 A | 11/1987 |
| JP | 2005350603 A | 12/2005 |
| JP | 2006063209 A | 3/2006 |
| JP | 2009084413 A | 4/2009 |
| WO | 2016168177 A1 | 10/2016 |
| WO | 2017065864 A2 | 4/2017 |

OTHER PUBLICATIONS

Brunauer et al., "Adsorption of Gases in Multimolecular Layers", Journal of the American Chemical Society, 1938, vol. 60, pp. 309-319.
Hsieh et al., "Anionic Polymerization Principles and Practical Applications", Marcel Dekker, Inc., 1996, 38 pages.
International Search Report and Written Opinion for International Application No. PCT/US2018/033849, dated Sep. 20, 2018, 11 pages.

* cited by examiner

*Primary Examiner* — Angela C Scott
(74) *Attorney, Agent, or Firm* — Albert Shung (57) ABSTRACT

According to an aspect of the invention, a curable rubber composition is provided which includes a high molecular weight diene elastomer; optionally, a carbon black composition; a silica composition; and a farnesene polymer comprising farnesene monomers. The farnesene polymer is modified with at least one silane group, has a number average molecular weight of 1,000 g/mol to 100,000 g/mol, and has a glass transition temperature of equal to or less than −50° C. According to another aspect of the invention, a method for producing a rubber composition for use in a tire is provided. The method includes forming a composition by mixing a farnesene polymer modified with at least one silane group, a silica composition, a high molecular weight diene elastomer, and optionally a carbon black composition, the farnesene polymer comprising farnesene monomers; and curing the composition.

18 Claims, 2 Drawing Sheets

SILANE FUNCTIONALIZED POLY (FARNESENE) AND RUBBER COMPOUND COMPRISING THE SAME

FIELD OF THE INVENTION

The present invention is directed to rubber compositions including silane functionalized farnesene polymers and, more particularly, to rubber compositions for forming tires including the same.

BACKGROUND OF THE INVENTION

When producing rubber compositions, it is common to utilize fillers for the purpose of reducing costs by replacing higher priced constituents of the rubber composition with less expensive constituents that may impart some additional functionality to the final rubber product. In order to achieve these advantages, the use of additives in combination with the fillers is often necessary. For example, German Publication No. DE 3010113, issued to Chemische Werke Huels AG, discloses the use of a poly(butadiene) as couplers for mineral fillers in polymers. Another German patent, DE 3129082, granted to the same company discloses a silane grafted poly(butadiene), which is used as couplers for inorganic fillers. An issued Japanese patent, JP 62265301, to Nippon Soda Co. describes the preparation of a silane-grafted poly(butadiene) used as a surface treating agent for mineral fillers.

Fillers that do not, by themselves, improve the mechanical properties of the rubber composition may be combined with dispersing and coupling agents to improve such properties. The dispersing and coupling agents physically or chemically interact with the polymer matrix and the filler at the boundary between the two phases and have the potential to impart improved physical properties to the rubber composition. For example, U.S. Pat. Nos. 4,381,377 and 4,396,751 disclose homo- or copolymer of a 1,3-diene bound to reactive silyl groups to form a crosslinked product having an improved modulus and curing rate. Therefore, some research has been concentrated on the potential use of such dispersing and coupling agents.

By manipulating rubber compositions, specific advantageous physical properties for tires made from such compositions is of particular interest for tire manufacturers. Reducing fuel consumption may be obtained by developing tires having a very low rolling resistance combined with excellent grip properties and handling behavior. This can produce significant cost and environmental benefits because improved physical properties of the tires can reduce fuel consumption. Accordingly, there is a constant need for improved dispersing and coupling agents that will reduce manufacturing costs and produce rubber compositions having advantageous physical properties, including wet traction, improved rolling resistance, and low temperature performance.

SUMMARY OF THE INVENTION

Aspects of the invention are directed to rubber compositions including silane functionalized farnesene polymers.

According to one aspect of the invention, a rubber composition is disclosed comprising high molecular weight diene elastomer, 5 to 120 phr of silica, 0 to 100 phr of a carbon black, and silane modified (preferably, terminally silane modified) polymer comprising farnesene monomers and optionally other diene and/or vinyl aromatic monomers in polymerized form, wherein the silane modified polymer has a number average molecular weight of 1,000 to 100,000 g/mol and a glass transition temperature below −50° C.

According to another aspect of the invention, a method of making a rubber composition is disclosed comprising compound mixing in situ high molecular weight diene elastomer, 5 to 120 phr of silica, 0 to 100 phr of a carbon black, and a silane modified polymer comprising farnesene monomers and optionally other diene and/or vinyl aromatic monomers in polymerized form, wherein the silane modified polymer has a number average molecular weight of 1,000 to 100,000 g/mol and a glass transition temperature below −50° C.

According to an additional aspect of the invention, provided is a curable rubber composition comprising, consisting essentially of or consisting of a high molecular weight diene elastomer; a silica composition; optionally, a carbon black composition; and a farnesene polymer comprising farnesene monomers. The farnesene polymer is modified with (i.e., contains) at least one silane group, has a number average molecular weight of 1,000 g/mol to 100,000 g/mol, and has a glass transition temperature of equal to or less than −50° C.

According to a further aspect of the invention, provided is a tire having a rubber composition obtained by curing a curable rubber composition. The curable rubber composition comprises, consists essentially of or consists of a high molecular weight diene elastomer; a silica composition; optionally, a carbon black composition; and a farnesene polymer comprising farnesene monomers. The farnesene polymer is modified with (i.e., contains, preferably in a terminal position) at least one silane group, has a number average molecular weight of 1,000 g/mol to 100,000 g/mol, and has a glass transition temperature of equal to or less than −50° C.

According to yet a further aspect of the invention, provided is a method for producing a rubber composition for use in a tire. The method comprises, consists essentially of or consists of forming a composition by mixing a high molecular weight diene elastomer, a farnesene polymer modified with at least one silane group, a silica composition, and optionally a carbon black composition, the farnesene polymer comprising farnesene monomers; and curing the composition.

BRIEF DESCRIPTION OF THE DRAWINGS

The invention is best understood from the following detailed description when read in connection with the accompanying drawings, with like elements having the same reference numerals. Included in the drawings are the following figures.

DETAILED DESCRIPTION OF THE INVENTION

The present inventors have discovered that improved rubber compositions may be produced using aspects of the present invention. Applicants have discovered that improved silica dispersion and low temperature performance may be achieved by the addition of a terminally silane functional low molecular weight polymer, such as poly(farnesene), in a rubber compound containing silica and silane coupling agents as fillers. For example, in accordance with one aspect of the invention, greatly improved silica dispersion and low temperature performance may be achieved utilizing the silane functional (preferably terminally silane functional) low molecular weight polymer disclosed herein, which may be adapted particularly for applications relating to tire production. The improvement in silica dispersion through the use of the low molecular weight silane functional polymer results in improved viscoelastic properties, which can be correlated to increased fuel economy and improved winter performance in tire tread compounds.

The inventors discovered that through the incorporation of hydrophobic silane functional additives, as discussed herein, the surface of the silica can be modified such that dispersive forces during mixing are improved, and well-dispersed filler conditions are realized. Accordingly, embodiments of the present invention provide improved solutions to inefficiencies of traditional rubber compositions for a tire. For example, the inventors recognized that while carbon black can be readily dispersed in hydrocarbon-based elastomers compounds and form bound polymer layers through Van der Waals interactions, silica is hydrophilic and does not readily mix with hydrocarbon elastomers. In the absence of hydrophobating surface agents, the silica will form an independent network within the elastomeric compound. This secondary network will break and reform during dynamic strain, a process which loses significant energy in the form of heat. However, using aspects of the present invention, the surface of the silica can be modified such that dispersive forces during mixing are improved, and well-dispersed filler conditions are realized. Thus, reduced fuel consumption may be obtained by developing tires having a very low rolling resistance combined with excellent grip properties and handling behavior. This can produce significant cost and environmental benefits because improved physical properties of the tires can reduce fuel consumption. As discussed in more detail below, in one embodiment, greatly improved silica dispersion and low temperature may be obtained using silane functional poly(farnesene) (particularly terminally silane functional poly(farnesene)) in combination with a silica composition and a silane coupling component. In one embodiment, the silane group is represented by the following formula: —Si(OR)$_3$, where each R is independently a C1-C6 alkyl group (e.g., methyl, ethyl) or an aryl group (e.g., phenyl).

According to another aspect of the invention, a sulfur-vulcanizable silica containing rubber compound is provided with improved processability and dynamic properties, which contains at least a silane modified polymer comprising farnesene monomer, and optionally other dienes and/or vinyl aromatic monomers, in polymerized form. The rubber composition may comprise 1 to 150 parts farnesene polymer, 5 to 120 parts of a silica, 0 to 100 parts of a carbon black, and 0 to 100 phr of one or more high molecular weight diene elastomers. The rubber composition may include 1 to 140 parts of farnesene polymer, e.g., 2 to 110 parts of farnesene polymer, 3 to 100 parts of farnesene polymer, 5 to 90 parts of farnesene polymer, 7 to 80 parts of farnesene polymer, 9 to 70 parts of farnesene polymer, 11 to 60 parts of farnesene polymer, 13 to 50 parts of farnesene polymer, 15 to 45 parts of farnesene polymer, 17 to 40 parts of farnesene polymer, or 19 to 30 parts of farnesene polymer. In other, non-limiting embodiments, the amount of farnesene polymer in the rubber composition is 1 to 50 parts farnesene polymer, 50 to 100 parts farnesene polymer, or 100 to 150 parts farnesene polymer. The amount of silica in the rubber composition may be, e.g., 6 to 90 parts of silica, 7 to 60 parts of silica, 8 to 40 parts of silica. The high molecular weight diene elastomers used in the rubber composition may include, but are not limited to, styrene butadiene rubber, butadiene rubber, polyisoprene rubber, or natural rubber, or blends of these rubber elastomers. The amount of high molecular weight diene elastomers in the rubber composition may be 0 to 100 phr, 5 to 90 phr, 10 to 80 phr, 15 to 70 phr, or 20 to 60 phr of high molecular weight diene elastomers. The high molecular weight diene elastomer may have a number average molecular weight $M_n$ of 100,000 Da or more, 200,000 Da or more, 300,000 Da or more, etc.

The silane modified polymer is preferably a silane modified low molecular weight poly(farnesene) which is capable of functioning as a reactive plasticizer, more preferably having a number average molecular weight of 2,000 to 50,000, and most preferably having a number average molecular weight 2,500 to 10,000.

The present inventors have discovered that embodiments of the present invention provide advantages over rubber compositions utilizing non-functionalized liquid poly(butadiene)s. Non-functionalized liquid poly(butadiene)s have been used in tire compounding. Due to their wide range of glass transition temperatures (Tg), low molecular weight diene elastomers are used as plasticizers to increase the grip properties or the low temperature performance behavior of tires. However, these low-molecular weight non-functionalized polymers have the disadvantage of producing tires with poor rolling resistance performance. However, according to one aspect of the invention, the rubber composition includes a farnesene polymer bearing one or more silane groups (preferably in one or more terminal positions), which enables rubber compositions having sufficient grip properties and low temperature performance without low molecular weight dienes. In accordance with an aspect of the present invention, a method is provided for producing a farnesene polymer comprising silane groups. Preferably, the method includes functionalizing one or more of the chain ends of the farnesene polymer rather than the polymer backbone. As a general overview, the method may include the steps of: forming a polymer with two living chain ends; and terminating the living chain ends with a reactive compound containing silane functionality or a reactive compound which yields a reactive group capable of further being derivatized into a silane functional group.

Figure 1:
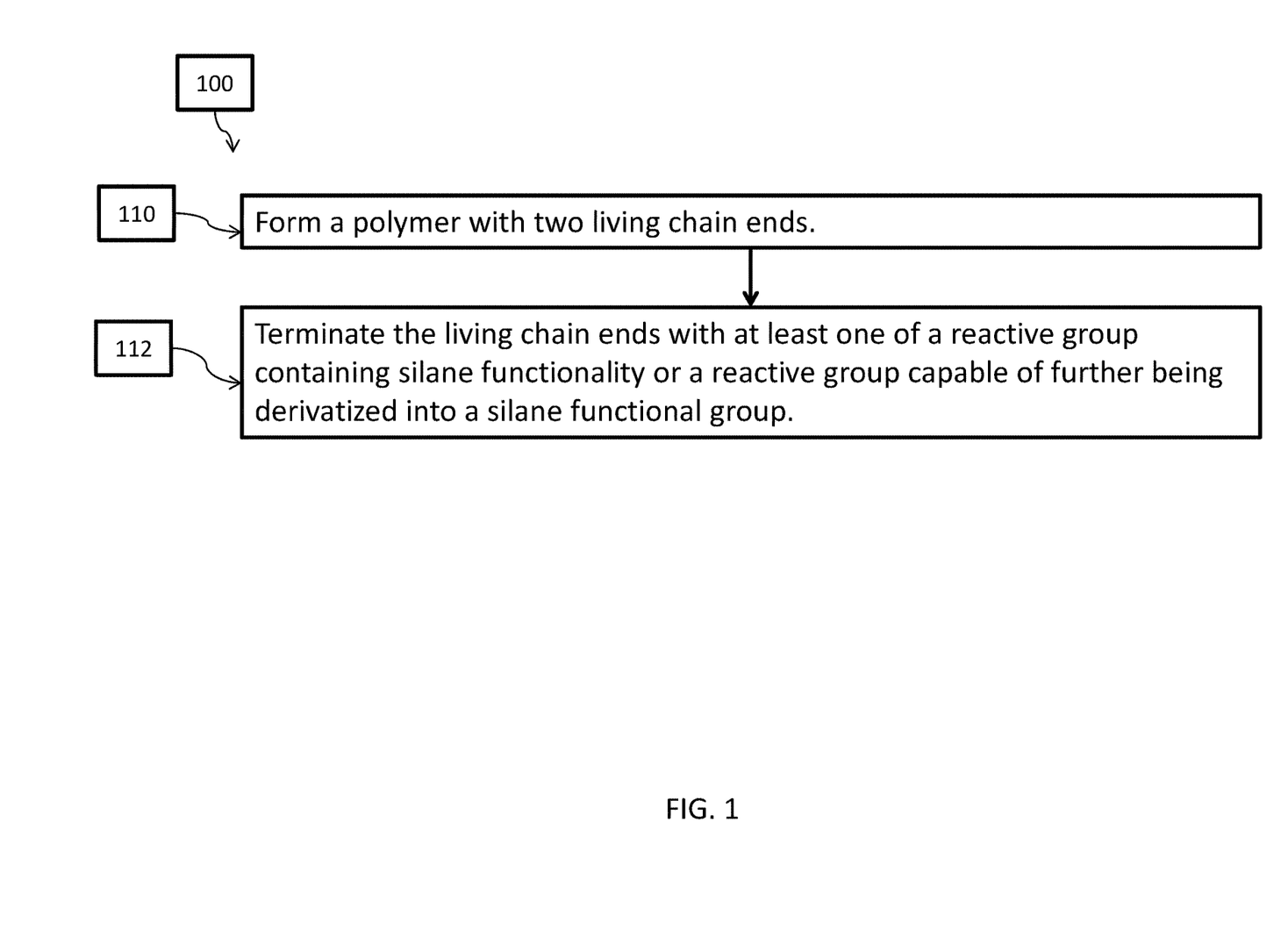
FIG. 1 is a flow chart depicting a non-limiting embodiment of a method for producing a silane-functionalized polymer, which can be a component of a rubber composition for use in a tire in accordance with aspects of the invention.

In step 110, a polymer with two living chain ends is formed. In one embodiment, the polymer is formed using an anionic difunctional initiator. The polymerization is preferably carried out under conditions effective to provide a living anionic polymerization. The present inventors recognized that pursuant to conventional wisdom it was believed that using soluble difunctional anionic initiators requires copious amounts of polar solvents in their preparation, and as these polar solvents carried over to the polymerization step, they influenced the resulting microstructure of the polymer, promoting 1,2-vinyl incorporation over 1,4-cis/trans incorporation of the diene monomers. More specifically, as many difunctional initiators are typically based on carbanions stabilized by a lithium anion, such dilithio initiators may be very polar and exhibit limited or no solubility in standard hydrocarbon solvents. Polar solvents, typically ethers, may be employed in the production and storage of the dilithio initiators, and also as the reaction media of the resulting polymerization. The addition of Lewis bases or lithium alkoxides can improve the systems, but, similar to ethers, at the expense of microstructural control. The lack of solubility of dilithio initiators in hydrocarbon media may limit their application in the production of certain polymers. Soluble dilithio initiators have been reported, but are based on butyllithium adducts of aromatic precursors and have disadvantages. Though soluble, the initiator species are highly aggregated in solution and are slow to initiate, which results in broad or multimodal molecular weight distributions, side-reactions, and the potential for less than quantitative functionality.

Figure 2:
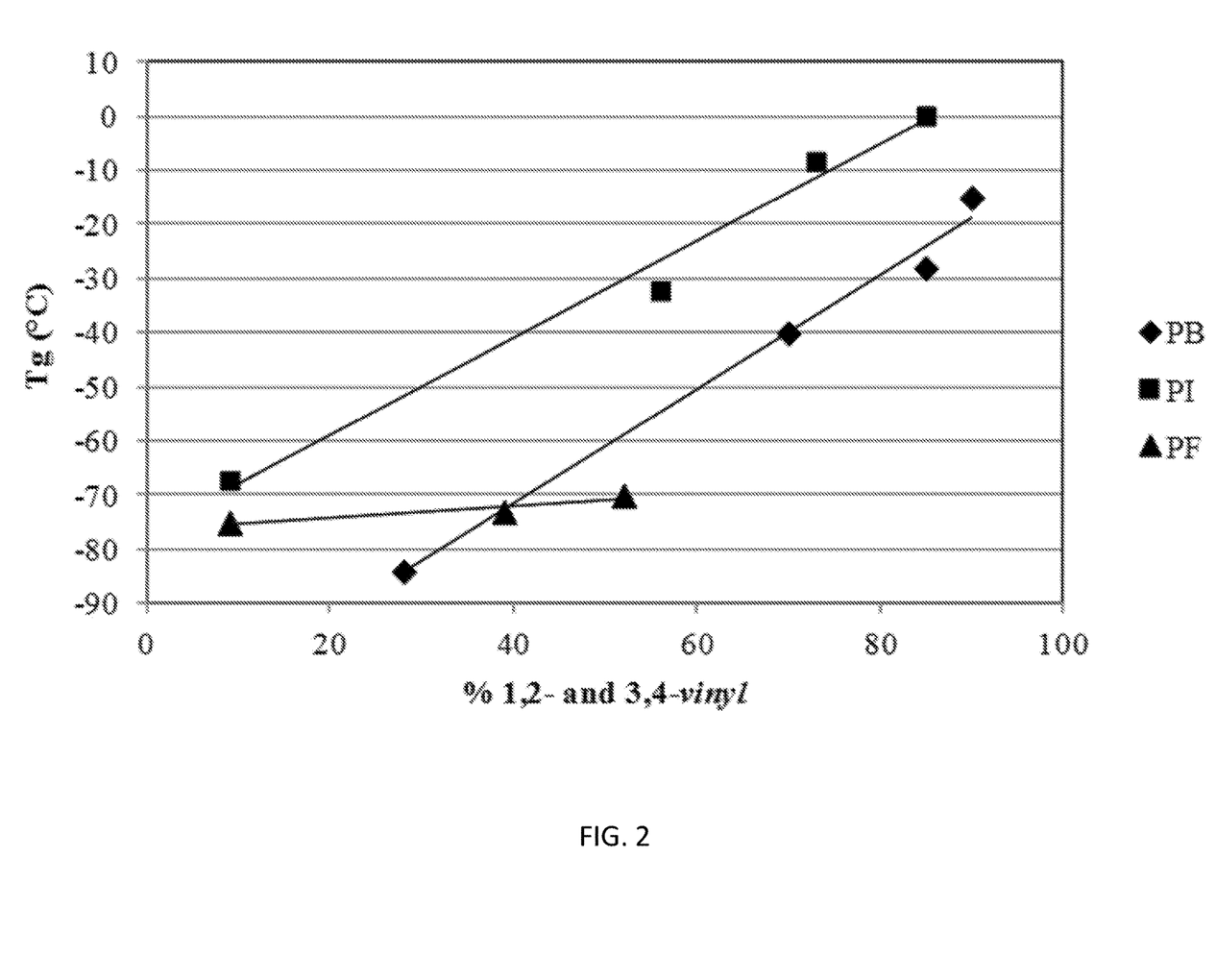
FIG. 2 is a graph comparing the glass transition temperatures of farnesene polymer, poly(butadiene), and poly(isoprenes) with varying amounts of 1,2 and 3, 4-vinyl monomers.

Difunctional initiators are typically prepared from the reaction of lithium with butadiene, isoprene, dimethylbutadiene, styrene or alpha-methylstyrene (Houben-Weyl Methoden der organischen Chemie, E. Müller Ed. Band 13/I, Georg Thieme 1970; H. L. Hsieh, R. P. Quirk, Anionic polymerization—principles and practical applications, Marcel Dekker 1996). Ziegler was probably the first to describe this reaction (K. Ziegler, L. Jakob, Ann. 511, 45 (1934)). Various modifications to the reaction have been published (e.g., U.S. Pat. No. 3,157,604, the disclosure of which is incorporated herein by reference in its entirety for all purposes). However, the preparation of such initiators requires the presence of strongly solvating ethers, such as tetrahydrofuran, which may in the subsequent polymerization lead to undesirable high vinyl content in the polydiene. These processes (e.g., using difunctional anionic initiators) to produce poly(butadiene)s and poly(isoprenes), for example, result in polymers having high glass transition temperatures (Tg). However, the present inventors were surprised to discover that a polymer prepared using farnesene monomer exhibits very little change in Tg with increasing vinyl incorporation, allowing for low Tg polymer production regardless of solvent type. A graph comparing the Tg of farnesene polymer, poly(butadiene), and poly(isoprenes) with varying amounts of 1,2 and 3,4-vinyl monomers is shown in FIG. 2. The result is that telechelic poly(farnesene) polymers can be produced under the same conditions as other polydienes, but due to the unique stereochemistry of the resulting microstructural isomers, low Tg materials can be prepared regardless of solvent type or anion. Without being bound by any one theory, the inventors discovered that the anionic polymerization of farnesene results in a "bottle-brush" structure, which describes a highly branched polymer with tightly spaced side chains. Each monomeric unit, regardless of the steroisomer, has a majority of its mass hanging from the main chain. The highly confined condition severely limits molecular motion such that, regardless of backbone configuration, the Tgs of the polymers change little as a function of microstructure (1,4-cis or -trans, 1,2 or 3,4-vinyl). The constrained geometry leads to a high excluded volume condition which dominates the thermal properties of farnesene-based polymers.

In step 112, the living chain ends of the farnesene polymer are terminated with at least one of a reactive compound containing silane functionality or a reactive compound which provides a reactive group (such as a hydroxyl group) capable of being further derivatized into a silane functional group (by reaction with an isocyanate-functionalized silane, for example). The inventors discovered that by replacing at least in part the non-functionalized polymers with a silane functionalized polymers in a silica-containing rubber compound, improved silica dispersion, processing, rolling resistance, and winter property behavior is realized. For polymers of relatively low molar mass, terminal silane functionality also effectively "ties down" the chain ends on the filler surface or through intermolecular condensation reactions, reducing another contribution to energy loss via chain-end motion upon dynamic strain. Therefore, the inventors discovered that functionalizing the terminal groups, as disclosed herein, provides a more effective reduction in heat build-up in tire compounds than functionalizing by way of grafting to the backbone, which leave the chain ends unaffected.

Method 100 advantageously enables the silane-functional polymer to be added/mixed with the silica composition in situ during compound mixing, rather than pre-blending or pre-reacting the silane coupling agent with the silica filler, which provides additional advantages by reducing the number of steps involved in the compounding process.

As another advantage, various methods may be employed to produce the silane modified polymer of the present invention. A first process includes producing a poly (farnesene) by anionic polymerization and capping the living end(s) of the poly(farnesene) with a silane ester such as tetraethoxysilane instead of protons. A second process is to react the living anionic poly(farnesene) chain end(s) with an alkylene oxide (e.g., ethylene oxide, propylene oxide) followed by a proton source, producing hydroxyl-terminated poly(farnesene). The hydroxyl-terminated poly(farnesene) can then be reacted with isocyanatosilanes (e.g., 3-(triethoxysilyl)propyl isocyanate) to form the silane-terminated poly (farnesene). In a third process, the terminal hydroxyl groups of the poly(farnesene) can be reacted with a diisocyanate, which can further react with aminosilanes producing the desired result.

Farnesene exists in isomer forms, such as α-farnesene ((3E,7E)-3,7,11-trimethyl-1,3,6,10-dodecatetraene) and β-farnesene (7,11-dimethyl-3-methylene-1,6,10-dodecatriene). In one embodiment, the farnesene monomers are (E)-β-farnesene, having the following structure:

as well (E)-β-farnesene in which one or more hydrogen atoms have been replaced by another atom or group of atoms (e.g., substituted).

The farnesene monomers used to produce various embodiments of the resin according to the present invention may be prepared by chemical synthesis from petroleum resources, extracted from insects, such as Aphididae, and/or plants, such as apples. Therefore, an advantage of the present invention is that the poly(farnesene) may be derived from a monomer obtained via a renewable resource. It is preferably prepared by culturing a microorganism using a carbon source derived from a saccharide. The poly (farnesene) utilized in the present invention may be efficiently prepared from farnesene monomer obtained via these sources.

The saccharide used may be any of monosaccharides, disaccharides, and polysaccharides, or may be a combination thereof. Examples of monosaccharides include glucose, galactose, mannose, fructose, and ribose. Examples of disaccharides include sucrose, lactose, maltose, trehalose, and cellobiose. Examples of polysaccharides include starch, glycogen, cellulose, and chitin.

The cultured microorganism that consumes the carbon source may be any microorganism capable of producing farnesene through culturing. Examples thereof include eukaryotes, bacteria, and archaebacteria. Examples of eukaryotes include yeast and plants. The microorganism may be a transformant obtained by introducing a foreign gene into a host microorganism. The foreign gene is not particularly limited, and it is preferably a foreign gene involved in the production of farnesene because it can improve the efficiency of producing farnesene. In the case of recovering farnesene from the cultured microorganism, the microorganism may be collected by centrifugation and disrupted, and then farnesene can be extracted from the disrupted solution with a solvent. Such solvent extraction may appropriately be combined with any known purification process such as distillation.

One or more diene elastomers are utilized in compositions of the present invention. Suitable diene elastomers for this purpose are generally high in molecular weight (e.g., a number average molecular weight $M_n$ above 80,000 Da) and contain sites of residual unsaturation which are capable of being cured (crosslinked) when the composition is heated to a sufficiently high temperature. In the context of the present invention, "diene elastomer" is understood to mean an elastomer (rubber) resulting at least in part from the polymerization of one or more diene monomers (monomers bearing two double carbon-carbon bonds, whether conjugated or not). Suitable diene elastomers include both homopolymers and copolymers. The diene elastomer(s) may be functionalized.

A diene elastomer suitable for use in the curable rubber compositions according to the invention may be "highly unsaturated," such as a polymer obtained from conjugated diene monomers which has a greater than 50% molar content of polymerized units of conjugated diene monomers.

According to one embodiment of the invention, the curable rubber composition may comprise one or more diene elastomers having a Tg between −110° C. and −40° C. Mixtures of diene elastomers having different glass transition temperatures may also be employed. For example, the curable rubber composition may comprise a first diene elastomer having a Tg of from −110° C. to −75° C. and a second diene elastomer having a Tg different from that of the first diene elastomer and in the range of from −75° C. to −40° C.

According to various aspects, highly unsaturated diene elastomers are utilized, in particular homopolymers obtained by homopolymerization of a conjugated diene monomer having 4 to 12 carbon atoms and/or copolymers obtained by copolymerization of one or more conjugated dienes with each other or with one or more vinyl aromatic compounds having 8 to 20 carbon atoms.

Suitable conjugated dienes are, in particular, 1,3-butadiene, 2-methyl-1,3-butadiene, 2,3-di(C1-C5 alkyl)-1,3-butadienes such as, for instance, 2,3-dimethyl-1,3-butadiene, 2,3-diethyl-1,3-butadiene, 2-methyl-3-ethyl-1,3-butadiene, 2-methyl-3-isopropyl-1,3-butadiene, aryl-1,3-butadienes, 1,3-pentadiene and 2,4-hexadiene. Suitable vinyl aromatic compounds are, for example, styrene, ortho-, meta- and para-methyl styrene, the commercial mixture "vinyltoluene", para-t-butylstyrene, methoxystyrenes, chlorostyrenes, vinylmesitylene, divinylbenzene and vinylnaphthalene and combinations thereof.

The copolymers may, for example, contain between 99% and 20% by weight of diene units (in bound/polymerized form) and between 1% and 80% by weight of vinyl aromatic units (in bound/polymerized form). The elastomers may have any microstructure, which is a function of the polymerization conditions used, in particular of the presence or absence of a modifying and/or randomizing agent and the quantities of modifying and/or randomizing agent used. The elastomers may, for example, be block, statistical (random), sequential or micro-sequential elastomers, and may be prepared in dispersion or in solution; they may be coupled and/or starred or alternatively functionalized with a coupling and/or starring or functionalizing agent.

Particular embodiments of the present invention use polybutadienes, including those having a content of 1,2-units between 4% and 80%, or those having a content of cis-1,4 [bonds] of more than 80%, polyisoprenes, butadiene-styrene copolymers, including those having a styrene content of between 5% and 50% by weight and more particularly, between 20% and 40%, a content of 1,2-bonds of the butadiene fraction of between 4% and 65%, and a content of trans-1,4 bonds of between 20% and 80%, butadiene-isoprene copolymers including those having an isoprene content of between 5% and 90% by weight and a glass transition temperature of between −40° C. and −80° C., isoprene-styrene copolymers and in particular those having a styrene content of between 5% and 50% by weight and a Tg of between −25° C. and −50° C. In the case of butadiene-styrene-isoprene copolymers, those that are suitable include, but are not limited to, those having a styrene content of between 5% and 50% by weight and more particularly, between 10% and 40%, an isoprene content of between 15% and 60% by weight, and more particularly between 20% and 50%, a butadiene content of between 5% and 50% by weight, and more particularly between 20% and 40%, a content of 1,2-units of the butadiene fraction of between 4% and 85%, a content of trans-1,4 units of the butadiene fraction of between 6% and 80%, a content of 1,2-plus 3,4-units of the isoprene fraction of between 5% and 70%, and a content of trans-1,4 units of the isoprene fraction of between 10% and 50%, and more generally any butadiene-styrene-isoprene copolymer having a Tg of between −20° C. and −70° C.

The diene elastomer(s) of the composition according to particular embodiments of the present invention may be selected from the group of highly unsaturated diene elastomers that include polybutadienes (BR), synthetic polyisoprenes (IR), natural rubber (NR), butadiene copolymers, isoprene copolymers and mixtures thereof.

Such copolymers may, in other embodiments, be selected from the group that includes butadiene-styrene copolymers (SBR), butadiene-isoprene copolymers (BIR), isoprene-styrene copolymers (SIR), isoprene-butadiene-styrene copolymers (SBIR) and mixtures thereof.

The curable rubber compositions used to prepare tires and other products in accordance with the invention may contain a single diene elastomer or a mixture of several diene elastomers, the diene elastomer(s) possibly being used in association with any type of synthetic elastomer other than a diene elastomer, or even with polymers other than elastomers, for example thermoplastic polymers.

The high molecular weight diene-based elastomers may be selected from the group consisting of polybutadienes, polyisoprenes, copolymers of butadiene and vinyl aromatic monomers, copolymers of isoprene and vinyl aromatic monomers, and combinations of two or more such diene elastomers. For example, elastomers that may be used in the present invention include styrene-isoprene-butadiene rubber (SIBR), styrene-isoprene rubber (SIR), isoprene-butadiene rubber (IBR). Natural rubber can also be used in addition to synthetic rubbers which may include neoprene (polychloroprene), polybutadiene (including cis 1,4-polybutadiene), polyisoprene (including cis-1,4-polyisoprene), butyl rubber, halobutyl rubber such as chlorobutyl rubber or bromobutyl rubber, acrylonitrile and methyl methacrylate rubbers, as well as ethylene/propylene terpolymers, also known as ethylene/propylene/diene monomer (EPDM), and in particular, ethylene/propylene/dicyclopentadiene terpolymers. Additional examples of rubbers which may be used include carboxylated rubbers, as well as silicon-coupled and tin-coupled star-branched polymers.

In one embodiment, the curable rubber composition includes at least one polybutadiene having a relatively high 1,4-cis content, e.g., a 1,4-cis content of at least 80%, at least 85% or at least 90%. In another embodiment, the curable rubber composition is comprised of at least one styrene/butadiene rubber, in particular a solution polymerized styrene/butadiene rubber. The bound styrene content of such a copolymer may be from 15 to 30% by weight, for example. The curable rubber composition may comprise both types of diene elastomer, e.g., at least one high 1,4-cis content polybutadiene and at least one solution-polymerized styrene/butadiene rubber. The content of high 1,4-cis butadiene rubber may be, for example, from 15 to 35 phr and the content of solution-polymerized styrene/butadiene rubber may be, for example, from 65 to 85 phr.

Examples of reinforcing fillers that may be included in the rubber compositions according to certain embodiments of the present invention include pyrogenic silica fillers and precipitated finely-divided silicas typically employed for rubber compounding. The silica filler, however, is preferably of the type obtained by precipitation from a soluble silicate, such as sodium silicate. For example, silica fillers may be produced according to the method described in U.S. Pat. No. 2,940,830, which is incorporated herein in its entirety for all purposes. The precipitated, hydrated silica pigments may have a $SiO_2$ content of at least 50% and usually greater than 80% by weight on an anhydrous basis. The silica filler may have an ultimate particle size in the range of from about 50 to 10,000 angstroms, preferably between 50 and 400 and, more preferably, between 100 and 300 angstroms. The silica may have an average ultimate particle size in a range of about 0.01 to 0.05 microns as determined by electron microscope, although the silica particles may even be smaller in size. The Brunauer-Emmett-Teller ("BET") surface area of the filler as measured using nitrogen gas is, preferably, in the range of 40 to 600 square meters per gram, more preferably 50 to 300 square meters per gram. The BET method of measuring surface area is described in the Journal of the American Chemical Society, Vol. 60, page 304 (1930). The silica also may have a dibutyl ("DBP") absorption value in a range of about 200 to about 400, with a range of from about 220 to 300 being preferred.

Various commercially available silicas and carbon black may be used as reinforcing fillers in various embodiments of the present invention. Suitable types of carbon black include, but are not limited to, super abrasion furnace, intermediate SAF, high abrasion furnace, easy processing channel, fast extruding furnace, high modulus furnace, semi-reinforcing furnace, fine thermal, and/or medium thermal carbon blacks. For example, silicas commercially available from PPG Industries under the Hi-Sil trademark such as, for example, those with designations 210, 243, etc.; silicas available from Rhone-Poulenc, with designations of Z1165MP and Z165GR and silicas available from Degussa AG with designations VN2 and VN3, etc. may be used. The Rhone-Poulenc Z1165MP silica is a preferred silica, which is reportedly characterized by having a BET surface area of about 160-170, a DBP value of about 250-290, and a substantially spherical shape. Suitable examples of carbon blacks include, but are not limited to, N110, N121, N220, N231, N234, N242, N293, N299, S315, N326, N330, N332, N339, N343, N347, N351, N358, N375, N539, N550, N582, N630, N642, N650, N683, N754, N762, N765, N774, N787, N907, N908, N990 and N991.

Representative reinforcing fillers may be included in rubber compositions according to various embodiments of the invention in amounts ranging from about 5 to 100 parts by weight of reinforcing fillers per 100 parts by weight of the total rubber composition (phr). Preferably, between about 10 and 50 parts by weight of reinforcing filler is used per 100 parts of rubber.

In compounding a rubber composition containing a filler, one generally uses a coupling agent. Silane coupling agents are particularly preferred. Such coupling agents, for example, may be premixed or pre-reacted with the filler or added to the rubber mix during the rubber/filler processing or mixing stage. If the coupling agent and filler are added separately to the rubber mix during the rubber/filler mixing or processing stage, it is considered that the coupling agent then combines in situ with the filler. Any coupling agents known to those of skill in the art may be employed in compositions of the present invention. Coupling agents are generally composed of a coupling agent which has a constituent silane component (i.e. moiety) capable of reacting with the silica surface and, also, a constituent component capable of reacting with the rubber. Preferably, the coupling agent is capable of reacting with a sulfur-vulcanizable rubber, which contains carbon-to-carbon double bonds, or unsaturation. In this manner, the coupler (coupling agent) may act as a connecting bridge between the silica and the rubber and, thereby, enhance the rubber reinforcement aspect of the silica.

The silane of the coupling agent may form a bond to the silica surface, possibly through hydrolysis, and the rubber reactive component of the coupling agent combines with the rubber itself. Usually the rubber reactive component of the coupler is temperature sensitive and tends to combine with the rubber during the final and higher temperature sulfur vulcanization stage. However, some degree of combination or bonding may occur between the rubber-reactive component of the coupler and the rubber during an initial rubber/silica/coupler mixing stage prior to a subsequent vulcanization stage.

The rubber composition may also contain conventional additives in addition to reinforcing fillers, including other fillers, peptizing agents, pigments, stearic acid, accelerators, sulfur vulcanizing agents, antiozonants, antioxidants, processing oils, activators, initiators, plasticizers, waxes, pre-vulcanization inhibitors, extender oils and the like.

Examples of sulfur vulcanizing agents include, but are not limited to, elemental sulfur (free sulfur) or sulfur donating vulcanizing agents, for example, an amine disulfide, polymeric polysulfide or sulfur olefin adducts. The amount of sulfur vulcanizing agent will vary depending on the type of rubber and particular type of sulfur vulcanizing agent, but generally range from about 0.1 phr to about 5 phr with a range of from about 0.5 phr to about 2 phr being preferred.

Examples of antidegradants that may be in a rubber composition according to various embodiments of the present invention include, but are not limited to, monophenols, bisphenols, thiobisphenols, polyphenols, hydroquinone derivatives, phosphites, phosphate blends, thioesters, naphthylamines, diphenol amines as well as other diaryl amine derivatives, para-phenylene diamines, quinolines and blended amines. Antidegradants are generally used in an amount ranging from about 0.1 phr to about 10 phr with a range of from about 2 to 6 phr being preferred.

Examples of a peptizing agent include, but are not limited to, pentachlorophenol, which may be used in an amount ranging from about 0.1 phr to 0.4 phr, with a range of from about 0.2 to 0.3 phr being preferred.

Examples of processing oils include, but are not limited to, aliphatic-naphthenic aromatic resins, polyethylene glycol, petroleum oils, ester plasticizers, vulcanized vegetable oils, pine tar, phenolic resins, petroleum resins, polymeric esters and rosins. A processing oils may be used in an amount ranging from about 0 to about 50 phr, with a range of from about 5 to 35 phr being preferred.

An example of an initiator includes, but is not limited to, stearic acid. Initiators may be used in an amount ranging from about 1 to 4 phr, with a range of from about 2 to 3 phr being preferred.

Examples of accelerators include, but are not limited to, amines, guanidines, thioureas, thiols, thiurams, disulfides, thiazoles, sulfenamides, dithiocarbamates, and xanthates. In cases where only a primary accelerator is used, the amounts used may range from about 0.5 to 2.5 phr. In cases where combinations of two or more accelerators are used, the primary accelerator may be used in amounts ranging from 0.5 to 2.0 phr and the secondary accelerator may be used in amounts ranging from about 0.1 to 0.5 phr. Combinations of accelerators have been known to produce a synergistic effect. Preferably, the primary accelerator is a sulfenamide. If a secondary accelerator is used, it is preferably a guanidine, a dithiocarbamate, and/or a thiuram compound.

The rubber compositions according to embodiments of the present invention may be compounded by conventional means known by those having skill in the art, including a mixer or compounder (such as a Banbury® mixer), mill, extruder, etc. The tires may be built, shaped, molded, and cured by various methods which will also be readily apparent to those having skill in such art.

To cure the curable rubber compositions of the present invention, any of the usual vulcanization or curing processes known in the art may be used such as heating with superheated steam or hot air in a press or mold. Accordingly, the curable rubber composition may be cured by a process comprising heating the curable rubber composition, which may be molded into a desired form, at a temperature and for a time effective to cure the diene elastomer(s).

Particular embodiments of the present invention include tires, in particular tire treads, that are intended for passenger-car or light truck tires but the invention is not limited only to such tires. It is noted that the particular embodiments of the tires of the present invention are intended to be fitted on motor vehicles (including passenger vehicles) or non-motor vehicles such as bicycles, motorcycles, racing cars, industrial vehicles such as vans, heavy vehicles such as buses and trucks, off-road vehicles such as agricultural, mining, and construction machinery, aircraft or other transport or handling vehicles.

The curable rubber compositions disclosed herein may be used for various rubber products such as tires, particularly a tread compound, and in other components for tires, industrial rubber products, seals, timing belts, power transmission belting, and other rubber goods. As such, the present invention includes products made from the curable rubber compositions disclosed herein.

Within this specification, embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

In some embodiments, the invention herein can be construed as excluding any element or process step that does not materially affect the basic and novel characteristics of the composition or process. Additionally, in some embodiments, the invention can be construed as excluding any element or process step not specified herein.

Although the invention is illustrated and described herein with reference to specific embodiments, the invention is not intended to be limited to the details shown. Rather, various modifications may be made in the details within the scope and range of equivalents of the claims and without departing from the invention.

EXAMPLES

In order that the invention may be more fully understood, the following non-limiting examples are provided by way of illustration only.

Example 1

A poly(farnesene) diol (Polymer 1) was prepared by combining 125.1 g of di-lithium based initiator and 1000 g of methyl-tert-butyl ether (MTBE) in a pressure reactor and purging with nitrogen three times. Subsequently, 225 g of trans-β-farnesene was added to the reactor at room temperature; the reaction was monitored and the temperature controlled to stay below 40° C. After polymerization was completed (approximately 35 minutes), a stoichiometric excess of propylene oxide (7.0 g) was added to the living polymerization solution, followed by adding purified water for neutralization. The polymer solution was mixed well for 15 minutes with purified water to wash the polymer solution. The stirring was stopped and over time the organic phase separated from the aqueous phase, at which point the aqueous phase was discharged and the pH determined. The washing step was repeated until the aqueous phase became neutral (pH=7). The separated organic phase was transferred to a three-neck flask and the MTBE solvent was removed under nitrogen purge with heating (150° C.). When the majority of solvent was removed, the polymer was steam stripped until one-half of the steam based on polymer volume was eliminated, then the polymer was nitrogen purged at 150° C. to pull out residual water. The isolated poly(farnesene) diol was cooled to 70° C. and transferred to a container. The number average molecular weight of the poly(farnesene) diol was approximately 3000 g/mol. The measured Tg was −66.5° C.

Example 2

The poly(farnesene) diol from Example 1 was reacted in the bulk with 3-(triethoxysilyl)propyl isocyanate in a stoichiometric amount based on the hydroxyl number of the poly(farnesene) diol. The number average molecular weight of the poly(farnesene) disilane (Polymer 2) was approximately 3500 g/mol. The measured Tg was −67.6° C.

Example 3

A poly(farnesene) monol (Polymer 3) was prepared by combining 100 g of farnesene and 200 g of (methyl-tert-butyl ether) MTBE, which were put into a pressure reactor and purged with nitrogen 3 times. 1.3 g of n-butyl lithium was added to the reactor at room temperature; the reaction was monitored and the temperature was controlled to stay below 40° C. After polymerization was completed (approximately 15 minutes), a stoichiometric excess of propylene oxide (2.0 g) was added to the living polymerization solution, followed by methanol (1.3 g) for neutralization. The polymer solution was then transferred to a three-neck flask equipped with a stirrer, and mixed well for 10 minutes with purified water to wash the polymer solution. The stirring was stopped and over time the organic phase separated from the aqueous phase, at which point the aqueous phase was discharged and the pH determined. The washing step was repeated until the aqueous phase became neutral (pH=7). The separated organic phase was transferred to another three-neck flask and the MTBE solvent was removed under nitrogen purge with heating (150° C.). When the majority of solvent was removed, the polymer was steam stripped until one-half of steam based on polymer volume was eliminated, then the polymer was nitrogen purged at 150° C. to pull out residual water. The isolated poly(farnesene) monol was cooled to 70° C. and transferred to a container. The number average molecular weight of the poly(farnesene) monol was approximately 5000 g/mol. The measured Tg was −70.6° C.

Example 4

The poly(farnesene) monol from Example 3 was reacted in bulk with 3-(triethoxysilyl)propyl isocyanate in a stoichiometric amount based on the hydroxyl number of the poly(farnesene) diol. The number average molecular weight of the poly(farnesene) monosilane (Polymer 4) was approximately 5250 g/mol. The measured Tg was −70.9° C.

Comparative Example 5

A poly(butadiene) diol was prepared by combining 125.1 g of di-lithium based initiator and 1600 g of methyl-tert-butyl ether (MTBE) in a pressure reactor and purging with nitrogen three times. Subsequently, 225 g of butadiene was added to the reactor at room temperature; the reaction was monitored and the temperature controlled to stay below 40° C. After polymerization was completed (approximately 35 minutes), a stoichiometric excess of propylene oxide (7.0 g) was added to the living polymerization solution, followed by adding purified water for neutralization. The polymer solution was mixed well for 15 minutes with purified water to wash the polymer solution. The stirring was stopped and over time the organic phase separated from the aqueous phase, at which point the aqueous phase was discharged and the pH determined. The washing step was repeated until the aqueous phase became neutral (pH=7). The separated organic phase was transferred to a three-neck flask and the MTBE solvent was removed under nitrogen purge with heating (150° C.). When the majority of solvent was removed, the polymer was steam stripped until one-half of the steam based on polymer volume was eliminated, then the polymer was nitrogen purged at 150° C. to pull out residual water. The isolated poly(butadiene) diol was cooled to 70° C. and transferred to a container. The poly(butadiene) diol was reacted in the bulk with 3-(triethoxysilyl)propyl isocyanate in a stoichiometric amount based on the hydroxyl number of the poly(butadiene) diol. The number average molecular weight of the poly(butadiene) disilane (Polymer 5) was approximately 3500 g/mol. The measured Tg was −45.1° C.

Comparative Example 6

A poly(butadiene) monol was prepared by combining 100 g of butadiene and 200 g of (methyl-tert-butyl ether) MTBE in a pressure reactor and purging with nitrogen 3 times. 1.3 g of n-butyl lithium was added to the reactor at room temperature; the reaction is monitored and the temperature was controlled to stay below 40° C. After polymerization was completed (approximately 15 minutes), a stoichiometric excess of propylene oxide (2.0 g) was added to the living polymerization solution, followed by adding methanol (1.3 g) for neutralization. The polymer solution was then transferred to a three-neck flask equipped with a stirrer, and mixed well for 10 minutes with purified water to wash the polymer solution. The stirring was stopped and over time the organic phase separated from the aqueous phase, at which point the aqueous phase was discharged and the pH determined. The washing step was repeated until the aqueous phase became neutral (pH=7). The separated organic phase was transferred to another three-neck flask and the MTBE solvent was removed under nitrogen purge with heating (150° C.). When the majority of solvent was removed, the polymer was steam stripped until one-half of steam based on polymer volume was eliminated, then the polymer was nitrogen purged at 150° C. to pull out residual water. The isolated poly(butadiene) monol was cooled to 70° C. and transferred to a container. The poly(butadiene) monol from Example 3 was reacted in the bulk with 3-(triethoxysilyl) propyl isocyanate in a stoichiometric amount based on the hydroxyl number of the poly(butadienee) diol. The number average molecular weight of the poly(butadiene) monosilane (Polymer 6) was approximately 5250 g/mol. The measured Tg was −48.0° C.

Compounding Procedure

Various rubber compositions were prepared containing the constituents in the proportions provided by Table 1, which represents a model tire tread compound. Poly(butadiene) (cis-BR, Buna® BR22) and solution poly(styrene-co-butadiene) (SSBR, VSL 5025-0 HM) were produced by Lanxess Corporation. Precipitated silica (ZS 1165MP) was acquired from Rhodia. The silane coupling agent used, Z-6945 (50% active on carbon black) was supplied by Dow Corning. Aromatic oil (Sundex® 790TN) was produced by Sunoco Inc. The zinc oxide and stearic acid used in the study were supplied by Sigma-Aldrich Company. Polymerized 2,2,4-trimethyl-1,2-dihydroquinoline (Flexol® TMQ) and N-isopropyl-N'-phenyl-p-phenylenediamine (Santoflex® IPPD) antioxidants and the accelerators N-cyclohexylbenzothiazole-2-sulfenamide (Santocure® CBS), diphenylguanidine (Perkacit® DPG), and tetramethylthiuram disulfide (Perkacit® TMTD) are commercial products of Flexsys America L.P. Rubbermaker's sulfur was provided by International Sulphur Inc.

Each compounded stock was mixed in a 350 cc internal mixer with cam blades (Brabender Prep Mixer). Three-stage mixing was used for each compound. First non-productive stage initial conditions were 100° C. heating and 40 rpm mixing. After all the ingredients were added and the internal temperature of the mixing compound reached 160° C., the mixing rpm was adjusted to maintain the compound internal temperature between 160 and 170° C. for a period of 5 minutes. The second non-productive stage initial conditions were again 100° C. heating and 40 rpm. Second stage mix time was 3 minutes after the ingredients were added to the first stage compound. The productive stage used initial conditions of 60° C. and 40 rpm and a total of 3 minutes mixing time after the vulcanization ingredients were added to the compound from stage two. Compounded stock was passed on a two roll mill between stages and prior to testing.

TABLE 1

Compound formulations

| Ingredient (phr) | | Compound | | | | | |
|---|---|---|---|---|---|---|---|
| | | 1 | 2 | 3 | 4 | 5 | 6 |
| Stage 1 | Buna ® CB22 | 25 | 25 | 25 | 25 | 25 | 25 |
| | VSL 5025-0HM | 75 | 75 | 75 | 75 | 75 | 75 |
| | Silica Z 1165MP | 65 | 65 | 65 | 65 | 65 | 65 |
| | Z6945 Silane | 10.4 | 10.4 | 10.4 | 10.4 | 10.4 | 10.4 |
| | Polymer 1 | 15 | | | | | |
| | Polymer 2 | | 15 | | | | |
| | Polymer 3 | | | 15 | | | |
| | Polymer 4 | | | | 15 | | |
| | Polymer 5 | | | | | 15 | |
| | Polymer 6 | | | | | | 15 |
| Stage 2 | Ist Stage Compound | 190.4 | 190.4 | 190.4 | 190.4 | 190.4 | 190.4 |
| | Stearic Acid | 1 | 1 | 1 | 1 | 1 | 1 |
| | IPPD | 2 | 2 | 2 | 2 | 2 | 2 |
| Stage 3 | 2nd Stage Compound | 193.4 | 193.4 | 193.4 | 193.4 | 193.4 | 193.4 |
| | Sulfur | 1.4 | 1.4 | 1.4 | 1.4 | 1.4 | 1.4 |
| | Zinc Oxide | 2.5 | 2.5 | 2.5 | 2.5 | 2.5 | 2.5 |
| | CBS | 1.7 | 1.7 | 1.7 | 1.7 | 1.7 | 1.7 |
| | TMTD | 1 | 1 | 1 | 1 | 1 | 1 |
| | DPG | 2 | 2 | 2 | 2 | 2 | 2 |

Polymer Testing

Molecular Characterization. Standard size exclusion chromatography (SEC) was utilized to determine molecular weight and molecular weight distributions of the polymer samples on an Agilent 1260 Infinity instrument in tetrahydrofuran (THF) using a guard column followed by two Agilent ResiPore columns in series with refractive index detection. Number and weight average molecular weight (Mn, Mw) and polydispersity (Mw/Mn) values for poly(butadienes) were determined using an in-house poly(butadiene) calibration curve. Poly(farnesene) values were determined using poly(styrene) calibration standards. While it is known that the choice of calibration standards can affect the reported molar mass, especially if structural differences between the calibration polymer and measured polymer exist, this technique has been chosen as it is a common practice. Thermal properties of the samples were determined using a TA Instruments, Inc. DSC Q2000 differential scanning calorimeter. Samples were prepared in aluminum hermetically sealed pans, equilibrated at 100° C. for one minute, cooled, and subjected to a temperature ramp at 10° C./minute from −150° C. to 100° C. Glass transition ($T_g$) at the inflection point was recorded.

Compound Testing

Uncured rheology and tensile properties. An oscillating die rheometer (ODR, Alpha PPA) was used to determine the uncured storage modulus, a value used to compare the processability of the rubber compound. Dynamic storage modulus was measured at 100° C. Physical testing was performed on samples cured in a press to t90 times (time to 90% of maximum torque, optimal cure) at the same temperature. Tensile data was acquired on a tensile machine (Thwing-Albert Materials Tester) following ASTM D 412.

Performance Testing

A Dynamic Mechanical Analyzer (DMA 2980, TA Instruments) was operated in tension to obtain temperature sweeps of the cured vulcanizates from −100° C. to 100° C. at 11 Hz and 0.1% strain amplitude. Tangent δ at 0° C. (or rebound at 23° C.) is used as a lab indicator for wet traction properties. A higher tan δ at 0° C. (or lower rebound at 23° C.) means improved wet traction properties. Tangent δ at 60° C. (or rebound at 70° C.) is used as a lab indicator for rolling resistance (also called fuel consumption). A lower tan δ at 60° C. (or higher rebound at 70° C.) means improved rolling resistance properties. Compliance (J') at −20° C. is used as a lab indicator for winter properties. A higher J' at −20° C. means improved winter properties.

Table 2 contains the results from comparative testing. Compounds 1-4 contain poly(farnesene) additives. Compounds 5-7 contain poly(butadiene) additives. Uncured storage modulus (G') values of the poly(farnesene)-containing compounds are lower than that for the poly(butadienes), indicating improved processability due to the unique poly(farnesene) polymer structure. Compounds 2 and 4 contain the silanated poly(farnesene) polymers. The effect of the additives in these compounds can be compared directly to the compounds containing the non-functional parent additives, Compounds 1 and 3, respectively. Note that molecular weight can also influence hysteresis values. Comparing the 100° C. rebound and tangent δ at 60° C. values of these compounds to the parent polymers demonstrate the benefits of silane functionality in lowering the hysteresis, or heat build-up properties, of the compound. Hot rebound increases and tangent δ at 60° C. values decrease when the poly(farnesene) polymers are functionalized. Lower hysteresis has been demonstrated to translate to improved rolling resistance in tires and other rubber articles. A comparison of room temperature (RT) rebound and tangent δ at 0° C. for the poly(farnesene) disilane (Compound 2) and the poly(butadiene) disilane (Compound 5) shows that despite the difference in Tg, wet traction indicators are comparable. This is unexpected. Comparing the compliance of Compounds 2 and 4 with Compounds 5 and 6 shows the benefit of a lower Tg silane-functional polymer additive, with the silane functional poly(farnesene)-containing compounds having higher low temperature compliance values, indicating improved winter performance.

It was unexpectedly found that low Tg, di-functional poly(farnesene) polymers can be produced by anionic polymerization under reaction conditions that lead to higher Tg poly(butadiene) polymers. Further, it was not anticipated that the low Tg polymers, when used as additives in rubber formulations, would provide both beneficial reductions in hysteresis combined with improved winter performance, while also maintaining the tractive properties of higher Tg additives.

TABLE 2

Compound testing results

| Test Parameter | Compound 1 | 2 | 3 | 4 | 5 | 6 |
|---|---|---|---|---|---|---|
| G'@ (2 Hz/14%) (kPa) | 372 | 384 | 431 | 420 | 531 | 463 |
| Modulus, 100% (Mpa) | 2.7 | 4.3 | 2.0 | 3.3 | 5.4 | 3.3 |
| RT Rebound (%) | 41.6 | 39.2 | 42.1 | 39.6 | 39.0 | 36.8 |
| Tangent delta @ 0° C. | 0.588 | 0.558 | 0.473 | 0.484 | 0.541 | 0.539 |
| 100 C. Rebound (%) | 67.2 | 70.8 | 57.3 | 66.1 | 70.1 | 65.7 |
| Tangent delta @ 60° C. | 0.062 | 0.048 | 0.105 | 0.051 | 0.022 | 0.071 |
| J' @ −20° C. (1/Mpa) | 8.55E−03 | 4.27E−03 | 1.48E−02 | 1.03E−02 | 3.44E−03 | 3.97E−03 |

What is claimed is:

1. A curable rubber composition comprising:
a high molecular weight diene elastomer having a number average molecular weight $M_n$ above 80,000 Da;
a silica;
a carbon black; and
a farnesene polymer produced via living anionic polymerization of at least one farnesene monomer, the farnesene polymer having at least one terminal end modified with at least one silane group, wherein the farnesene polymer has a number average molecular weight of 1,000 g/mol to 100,000 g/mol, a silane functionality of two or less and a glass transition temperature of equal to or less than −40° C., wherein the farnesene polymer is produced by process i) or process ii):
i) a process comprising polymerizing farnesene monomers to obtain a living farnesene polymer having one or more living ends and capping the living ends of the living farnesene polymer with a silane ester;
ii) a process comprising polymerizing farnesene monomers to obtain a living farnesene polymer, modifying at least one terminal end of the living farnesene polymer by reacting the living farnesene polymer with an alkylene oxide followed by a proton source to produce a hydroxyl-terminated farnesene polymer having at least one terminal hydroxyl group, and modifying at least one terminal hydroxyl group of the hydroxyl-terminated farnesene polymer by converting the at least one terminal hydroxyl group to a silane group.

2. The curable rubber composition of claim 1, wherein the farnesene polymer is produced via living anionic polymerization of at least one farnesene monomer and at least one of a vinyl aromatic monomer or a diene monomer.

3. The curable rubber composition of claim 1, wherein the number average molecular weight of the farnesene polymer is 2,000 g/mol to 50,000 g/mol.

4. The curable rubber composition of claim 3, wherein the number average molecular weight of the farnesene polymer is 2,500 g/mol to 10,000 g/mol.

5. The curable rubber composition of claim 1, wherein the silica is obtained from precipitation of soluble silicate.

6. The curable rubber composition of claim 1, further comprising at least one silane coupling agent.

7. The curable rubber composition of claim 1, wherein the silane group is represented by the following formula: —Si(OR)$_3$, where each R is independently a C1-C6 alkyl group or an aryl group.

8. The curable rubber composition of claim 1, wherein the farnesene polymer is produced by process ii) and converting the at least one terminal hydroxyl group to a silane group comprises either i) reacting the at least one terminal hydroxyl group with an isocyanatosilane or ii) reacting the at least one terminal hydroxyl group with a diisocyanate and then an aminosilane.

9. A tire comprising a rubber composition obtained by curing the curable rubber composition of claim 1.

10. The tire of claim 9, wherein the farnesene polymer is produced via living anionic polymerization of at least one farnesene Monomer and at least one of a diene monomer and a vinyl aromatic monomer.

11. The tire of claim 9, wherein the number average molecular weight of the farnesene polymer is 2,000 g/mol to 50,000 g/mol.

12. The tire of claim 11, wherein the number average molecular weight of the farnesene polymer is 2,500 g/mol to 10,000 g/mol.

13. The tire of claim 9, wherein the curable rubber composition further comprises at least one silane coupling agent.

14. The tire of claim 9, wherein the silica is obtained from precipitation of soluble silicate.

15. The tire of claim 9, wherein the curable rubber composition has been cured using at least one sulfur vulcanizing agent.

16. A method for producing a rubber composition adapted for use in a tire, the method comprising:
forming the curable rubber composition of claim 1 by mixing the farnesene polymer, the silica, the high molecular weight diene elastomer having a number average molecular weight $M_n$ above 80,000 Da, and the carbon black; and
curing the curable rubber composition.

17. The method of claim 16, wherein the farnesene polymer has been prepared by process ii).

18. A curable rubber composition comprising:
a high molecular weight diene elastomer having a number average molecular weight $M_n$ above 80,000 Da;
a silica;
a carbon black; and
a farnesene polymer produced via living anionic polymerization of at least one farnesene monomer, wherein the farnesene polymer consists of farnesene monomers and has at least one terminal end modified with at least one silane group, a number average molecular weight of 1,000 g/mol to 100,000 g/mol, a silane functionality of two or less and a glass transition temperature of equal to or less than −40° C.

* * * * *